(12) United States Patent
Gladnick (10) Patent No.: US 9,602,715 B2
(45) Date of Patent: Mar. 21, 2017

(54) ADAPTABLE OPERATING FREQUENCY OF A VARIABLE FOCAL LENGTH LENS IN AN ADJUSTABLE MAGNIFICATION OPTICAL SYSTEM

(71) Applicant: Mitutoyo Corporation, Kanagawa-ken (JP)

(72) Inventor: Paul Gerard Gladnick, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 87 days.

(21) Appl. No.: 14/795,409

(22) Filed: Jul. 9, 2015

(65) Prior Publication Data

US 2017/0013185 A1    Jan. 12, 2017

(51) Int. Cl.
| | | |
|---|---|---|
| H04N 5/232 | (2006.01) | |
| G02B 3/00 | (2006.01) | |
| G02B 15/04 | (2006.01) | |
| G02F 1/33 | (2006.01) | |

(52) U.S. Cl.
CPC ....... H04N 5/23212 (2013.01); G02B 3/0087 (2013.01); G02B 15/04 (2013.01); G02F 1/33 (2013.01); H04N 5/23296 (2013.01)

(58) Field of Classification Search
CPC ........... H04N 5/23212; H04N 5/23296; G02B 3/0087; G02B 15/04; G02F 1/33
See application file for complete search history.

(56) References Cited

U.S. PATENT DOCUMENTS

| | | |
|---|---|---|
| 6,542,180 B1 | 4/2003 | Wasserman et al. |
| 7,324,682 B2 | 1/2008 | Wasserman |
| 7,454,053 B2 | 11/2008 | Bryll et al. |
| 7,567,713 B2 | 7/2009 | Ding |
| 7,570,795 B2 | 8/2009 | Yu et al. |
| 7,626,705 B2 | 12/2009 | Altendorf |
| 7,627,162 B2 | 12/2009 | Blanford et al. |
| 7,668,388 B2 | 2/2010 | Bryll |
| 7,723,657 B2 | 5/2010 | Altendorf et al. |

(Continued)

OTHER PUBLICATIONS

Euan McLeod et al., "Mechanics and refractive power optimization of tunable acoustic gradient lenses," Journal of Applied Physics 102, 033104 (2007), American Institute of Physics, 9 pages.

(Continued)

Primary Examiner — Jason Flohre
(74) Attorney, Agent, or Firm — Seed Intellectual Property Law Group LLP (57) ABSTRACT

An imaging system is provided for a precision machine vision inspection or metrology system. The imaging system optical path includes a variable magnification lens portion and a variable focal length lens portion. The variable magnification lens portion includes various magnification states (e.g., 0.5× to 100×, using interchangeable lenses, or the like.) The variable focal length lens portion (e.g., including a tunable acoustic gradient index of refraction ("TAG") lens) is operated at different focal length scanning frequencies depending on the magnification state. A TAG lens operated in this manner provides a relatively consistent range of focus (e.g., corresponding to a number of depths of field) with various magnification lenses, without limiting the effective numerical aperture of the imaging system.

20 Claims, 7 Drawing Sheets

(56) References Cited

U.S. PATENT DOCUMENTS

| | | |
|---|---|---|
| 7,728,961 B2 | 6/2010 | Watson |
| 7,769,222 B2 | 8/2010 | Blanford, Jr. et al. |
| 8,111,905 B2 | 2/2012 | Campbell |
| 8,111,938 B2 | 2/2012 | Bryll et al. |
| 8,194,307 B2 | 6/2012 | Arnold et al. |
| 8,212,997 B1 | 7/2012 | Xie |
| 8,269,830 B1 | 9/2012 | Delaney |
| 8,576,478 B2 | 11/2013 | Arnold et al. |
| 8,581,162 B2 | 11/2013 | Campbell |
| 8,587,772 B2 | 11/2013 | Sesko et al. |
| 8,587,789 B2 | 11/2013 | Sesko |
| 8,860,931 B2 | 10/2014 | Patzwald |
| 8,902,307 B2 | 12/2014 | Delaney et al. |
| 8,917,940 B2 | 12/2014 | Bryll |
| 8,957,960 B2 | 2/2015 | Saylor et al. |
| 9,013,574 B2 | 4/2015 | Saylor et al. |
| 9,060,117 B2 | 6/2015 | Bryll et al. |
| 9,143,674 B2 | 9/2015 | Gladnick |
| 2008/0149867 A1* | 6/2008 | Konishi ............ G02B 21/0064 250/582 |
| 2010/0177376 A1* | 7/2010 | Arnold ................ G02B 3/0087 359/307 |
| 2011/0133054 A1* | 6/2011 | Campbell .......... G01B 11/0608 250/201.2 |
| 2012/0140243 A1* | 6/2012 | Colonna de Lega ................ A61F 9/00836 356/609 |
| 2013/0027538 A1 | 1/2013 | Ding et al. |
| 2013/0141782 A1* | 6/2013 | Theriault ................ G02B 3/14 359/368 |
| 2013/0148196 A1* | 6/2013 | Arnold ................ G02B 21/025 359/385 |
| 2013/0162806 A1 | 6/2013 | Ding et al. |
| 2013/0162807 A1 | 6/2013 | Bryll et al. |
| 2013/0321927 A1 | 12/2013 | Arnold et al. |
| 2014/0036346 A1 | 2/2014 | Arnold et al. |
| 2014/0168752 A1 | 6/2014 | Arnold et al. |
| 2014/0211299 A1 | 7/2014 | Arnold et al. |
| 2014/0268320 A1* | 9/2014 | Kaneko ................ G02B 21/16 359/389 |
| 2014/0294284 A1 | 10/2014 | Bryll |
| 2014/0300726 A1 | 10/2014 | Gladnick |
| 2014/0368726 A1* | 12/2014 | Gladnick .......... G01B 11/0608 348/349 |
| 2015/0009484 A1 | 1/2015 | Sesko |
| 2015/0015696 A1 | 1/2015 | Delaney |
| 2015/0100278 A1* | 4/2015 | Gaylord ................ G01N 21/41 702/189 |
| 2015/0145980 A1* | 5/2015 | Bryll .................... G02B 21/241 348/79 |

OTHER PUBLICATIONS

Marti Duocastella et al., "Simultaneous imaging of multiple focal planes for three-dimensional microscopy using ultra-high-speed adaptive optics," SPIE, Journal of Biomedical Optics, 4 pages.

Mermillod-Blondin et al., "High-speed varifocal imaging with a tunable acoustic gradient index of refraction lens," Department of Mechanical and Aerospace Engineering, Princeton University, Optics Letters, vol. 33(18), Princeton, New Jersey, Sep. 15, 2008, 3 pages.

Tag Optics Inc., "The Physics Behind Tag Opctics' Technology and the Mechanism of Action of Using Sounds to Shape Light," Application Notice 12-001, Physics behind the TAG Technology, 6 pages.

"QVPAK 3D CNC Vision Measuring Machine Operation Guide," Version 2.0, published Sep. 1996, 86 pages.

"QVPAK 3D CNC Vision Measuring Machine User's Guide," Version 7, published Jan. 2003, 217 pages.

Aschwanden, "Autofocus microscope with a constant numerical aperture (NA) and field of view (FOV)," Optotune AG, Oct. 2013, 6 pages.

Blum et al., "Compact optical design solutions using focus tunable lenses," SPIE Optical Design and Engineering IV, Proceeding vol. 8167, Sep. 22, 2011, 9 pages.

Chen et al., "Remote focal scanning optical projection tomography with an electrically tunable lens," Biomedical Optics Express, vol. 5(10), Oct. 2014, 9 pages.

Duocastella et al., "Simultaneous imaging of multiple focal planes for three-dimensional microscopy using ultra-high-speed adaptive optics," SPIE, Journal of Biomedical Optics, May 2012, 4 pages.

Fahrbach et al., "Rapid 3D light-sheet microscopy with a tunable lens," Optics Express, vol. 21(18), Sep. 9, 2013, 17 pages.

Lipp et al., "Rapid Beam Shaping and Focussing Using Tunable Acoustic Gradient Index Lenses," Department of Mechanical and Aerospace Engineering, 5 pages.

Nagahara et al., "Flexible Depth of Field Photography," Proceedings of the European Conference on Computer Vision, Oct. 2008, 14 pages.

Olivier et al., "Two-photon microscopy with simultaneous standard and extended depth of field using a tunable acoustic gradient-index lens," Optical Society of America, Optics Letters, vol. 34(11), Jun. 1, 2009, 3 pages.

Optotune AG, "Optical focusing in microscopy with Optotune's focus tunable lens EL-10-30," Application Note, Sep. 2011, 13 pages.

Tag Optics Inc., "The Physics Behind Tag Optics' Technology and the Mechanism of Action of Using Sound to Shape Light," Application Notice 12-001, Physics Behind the TAG Technology, Mar. 2013, 6 pages.

* cited by examiner

*Microscope Characteristics in Relation to Magnification*
(TAG Lens Freq. = 70 KHz, 4f optical config.)

ADAPTABLE OPERATING FREQUENCY OF A VARIABLE FOCAL LENGTH LENS IN AN ADJUSTABLE MAGNIFICATION OPTICAL SYSTEM

BACKGROUND

Technical Field

This disclosure relates to precision metrology, and more particularly to adjustable magnification optical systems such as machine vision inspection systems.

Description of the Related Art

Adjustable magnification optical systems may be utilized in precision non-contact metrology systems such as precision machine vision inspection systems (or "vision systems" for short). Such vision systems may be utilized to obtain precise dimensional measurements of objects and to inspect various other object characteristics, and may include a computer, a camera and optical system, and a precision stage that moves to allow workpiece traversal and inspection. One exemplary prior art system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in its entirety. This type of system uses a microscope-type optical system and moves the stage so as to provide inspection images of either small or relatively large workpieces at various magnifications.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

In various applications, it is desirable to perform high speed autofocus and/or other operations to facilitate high-speed measurements for high throughput in either stationary or non-stop moving inspection systems. The speed of autofocus and other operations requiring focusing in conventional machine vision inspection systems is limited by the motion of the camera through a range of Z-height positions. There is a need for improved autofocus and/or other operations utilizing alternative methods of collecting images of a range of focus distances (e.g., stacks of images for measuring Z-height positions) at a high speed and which particularly are operable at different levels of magnification without compromising the range of focus, image quality and/or dimensional accuracy in the images.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An imaging system is provided for use in a precision non-contact metrology system (e.g., such as a machine vision system, a measuring microscope, etc.) In various implementations, an optical path of the imaging system includes a variable magnification lens portion and a variable focal length lens portion. The variable magnification lens portion may be alterable between a first magnification state that provides a relatively lower magnification for the imaging system and a second magnification state that provides a relatively higher magnification for the imaging system. The variable focal length lens portion may include a variable focal length lens (hereafter a "VFL lens") that provides a periodically modulated focal length that can be modulated at a first or second frequency that each provide a plurality of modulation periods during an image exposure period used by the imaging system. As one specific example, in an exemplary imaging system that is able to collect video images at 30 frames per second and for which the VFL lens may be operated at frequencies of 30 kHz or more, there may be over 1,000 modulation periods during each image exposure period used by the imaging system.

In various implementations, the variable focal length lens portion may be configured to be operated at the first frequency and a first modulation amplitude to provide a first range for the periodically modulated focal length of the VFL lens while the imaging system is operated using the first magnification state. The first range may correspond to a focus distance range of the imaging system during the first magnification state. The variable focal length lens portion may further be configured to be operated at the second frequency and a second modulation amplitude to provide a second range for the periodically modulated focal length of the VFL lens while the imaging system is operated using the second magnification state. The second range may be greater than the first range, and may correspond to a focus distance range of the imaging system during the second magnification state.

DETAILED DESCRIPTION

Figure 1:
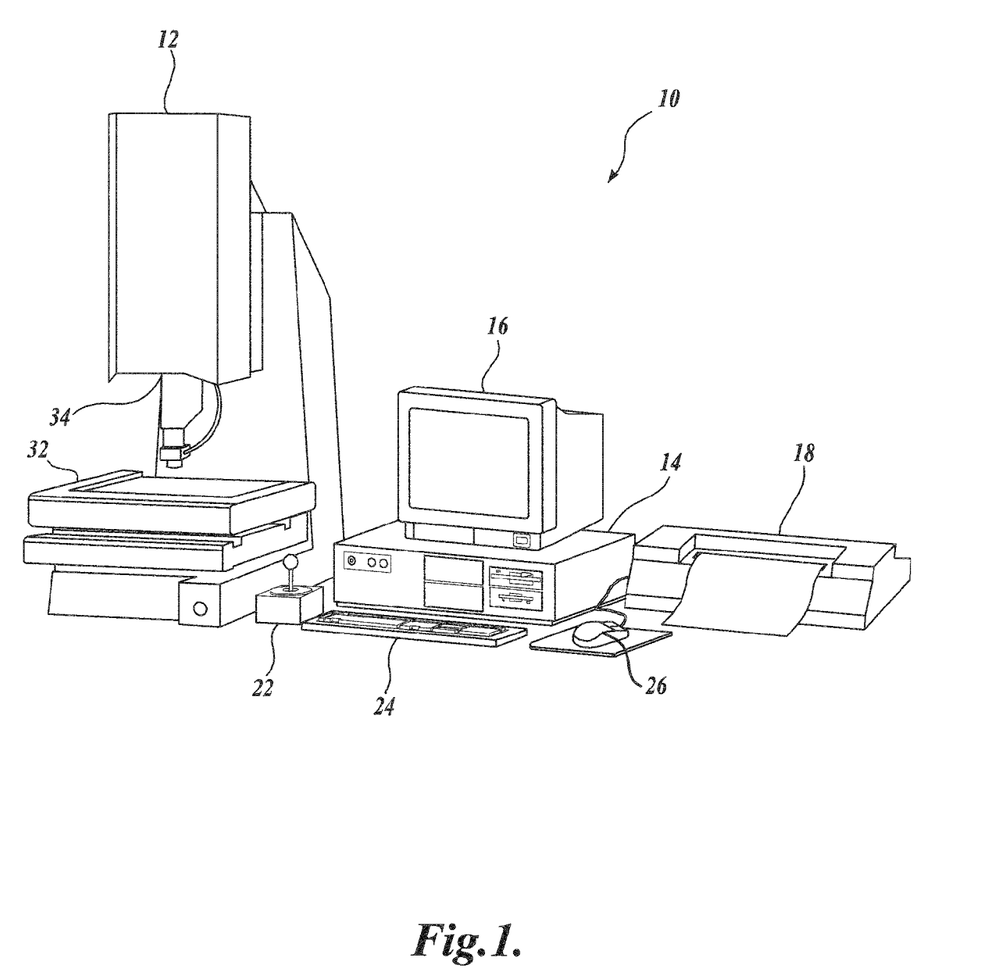
FIG. 1 is a diagram showing various typical components of a general-purpose precision machine vision inspection system.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various implementations, a touchscreen tablet or the like may be substituted for and/or redundantly provide the functions of any or all of the computer system 14, the display 16, the joystick 22, the keyboard 24, and the mouse 26.

Those skilled in the art will appreciate that the controlling computer system 14 may generally consist of any computing system or device. Suitable computing systems or devices may include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision measuring machine 12 includes a moveable workpiece stage 32 and an optical imaging system 34 that may include a zoom lens or interchangeable lenses. The zoom lens or interchangeable lenses generally provide various magnifications for the images provided by the optical imaging system 34. The machine vision inspection system 10 is also described in commonly assigned U.S. Pat. Nos. 7,454,053; 7,324,682; 8,111,905; and 8,111,938, each of which is hereby incorporated herein by reference in its entirety.

Figure 2:
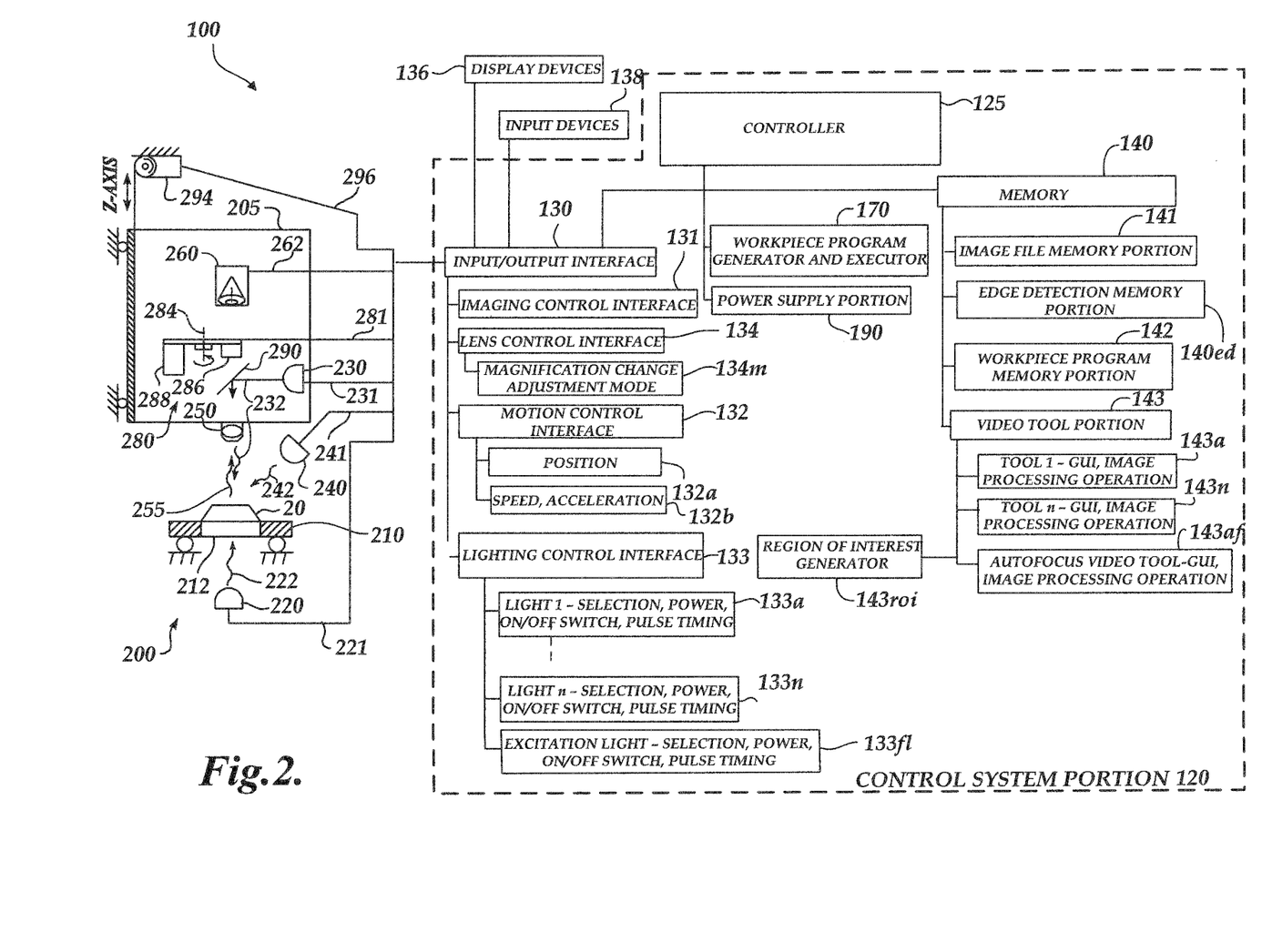
FIG. 2 is a block diagram of a control system portion and a vision components portion of a machine vision inspection system similar to that of FIG. 1 and including features disclosed herein.

FIG. 2 is a block diagram of a control system portion 120 and a vision components portion 200 of a machine vision inspection system 100 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along x- and y-axes that lie in a plane that is generally parallel to the surface of the stage where a workpiece 20 may be positioned.

The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. In various implementations, the various lenses may be included as part of a variable magnification lens portion of the optical assembly portion 205. In various implementations, the interchangeable objective lens 250 may be selected from a set of fixed magnification objective lenses that are included as part of the variable magnification lens portion (e.g., a set of objective lenses corresponding to magnifications such as 0.5×, 1×, 2× or 2.5×, 5×, 10×, 20× or 25×, 50×, 100×, etc.).

The optical assembly portion 205 is controllably movable along a z-axis that is generally orthogonal to the x- and y-axes by using a controllable motor 294 that drives an actuator to move the optical assembly portion 205 along the z-axis to change the focus of the image of the workpiece 20. The controllable motor 294 is connected to an input/output interface 130 via a signal line 296. A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20.

One or more of a stage light 220, a coaxial light 230, and a surface light 240 (e.g., a ring light) may emit source light 222, 232, and/or 242, respectively, to illuminate the workpiece or workpieces 20. The coaxial light 230 may emit light 232 along a path including a mirror 290. The source light is reflected or transmitted as workpiece light 255, and the workpiece light used for imaging passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. The control system portion 120 may rotate the turret lens assembly 280 along axis 284 to select a turret lens through a signal line or bus 281 to alter an image magnification.

As shown in FIG. 2, in various exemplary implementations, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements. The input/output interface 130 includes an imaging control interface 131, a motion control interface 132, a lighting control interface 133, and a lens control interface 134. The lens control interface 134 may include a lens controller including a lens focus operating circuit and/or routine, or the like. The lens control interface 134 may further include a magnification change adjustment mode 134$m$, which may be selected or automatically implemented when a magnification change is made or detected. The operations and components associated with the magnification change adjustment mode 134$m$ are described in more detail below with respect to FIGS. 3-6.

In various implementations, the imaging control interface 131 may include an extended depth of field mode, as described in more detail in copending and commonly assigned U.S. Patent Publication No. 2015/0145980, which is hereby incorporated herein by reference in its entirety. An extended depth of field mode may be selected by a user to provide at least one image (e.g., a composite image) of a workpiece with a depth of field that is greater than what may be provided by the vision components portion 200 when focused at a single focus position. The motion control interface 132 may include a position control element 132a, and a speed/acceleration control element 132b although such elements may be merged and/or indistinguishable. The lighting control interface 133 may include lighting control elements 133a, 133n, and 133/1 that control, for example, the selection, power, on/off switch, and strobe pulse timing, if applicable, for the various corresponding light sources of the machine vision inspection system 100.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. In various implementations, the autofocus video tool 143af may additionally include a high-speed focus height tool that may be utilized to measure focus heights with high speed using hardware described in FIG. 3, as described in more detail in copending and commonly assigned U.S. Patent Publication No. 2014/0368726, which is hereby incorporated herein by reference in its entirety. In various implementations, the high-speed focus height tool may be a special mode of the autofocus video tool 143af that may otherwise operate according to conventional methods for autofocus video tools, or the operations of the autofocus video tool 143af may only include those of the high-speed focus height tool.

In the context of this disclosure, and as is known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool with the underlying operations being included implicitly.

The signal lines or busses 221, 231, and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) may also be connected to the input/output interface 130. The display devices 136 and input devices 138 may be used to display a user interface that may include various graphical user interface (GUI) features that are usable to perform inspection operations, and/or to create and/or modify part programs, to view the images captured by the camera system 260, and/or to directly control the vision system components portion 200. The display devices 136 may display user interface features (e.g., as associated with the autofocus video tool 143af, etc.).

In various exemplary implementations, when a user utilizes the machine vision inspection system 100 to create a part program for the workpiece 20, the user generates part program instructions by operating the machine vision inspection system 100 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program.

Figure 3:
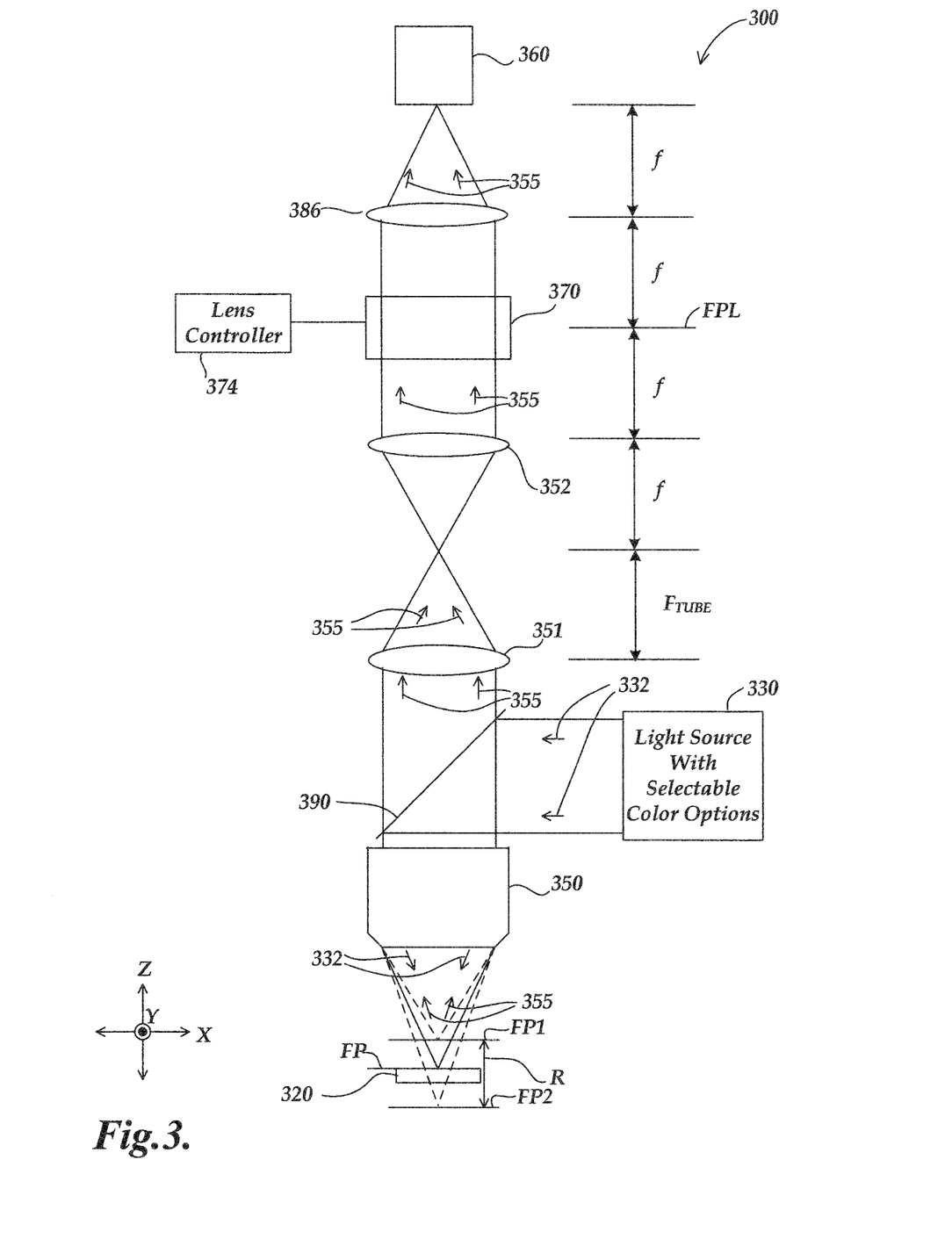
FIG. 3 is a schematic diagram of an imaging system that may be adapted to a precision non-contact metrology system such as a machine vision inspection system and operated according to the principles disclosed herein.

FIG. 3 is a schematic diagram of an imaging system 300 that may be adapted to a precision non-contact metrology system such as a machine vision inspection system and operated according to the principles disclosed herein. The imaging system 300 comprises a light source 330 that is configurable to illuminate a workpiece 320 (e.g., with strobed or continuous-wave illumination) in a field of view of the imaging system 300, an objective lens 350, a tube lens 351, a relay lens 352, a variable focal length lens (VFL) 370, a relay lens 386, and a camera system 360.

In operation, the light source 330 is configurable to emit source light 332 along a path including a partial mirror 390 and through the objective lens 350 to a surface of a workpiece 320, wherein the objective lens 350 receives workpiece light 355 that is focused at a focus position FP proximate to the workpiece 320, and outputs the workpiece light 355 to the tube lens 351. In various implementations, the objective lens 350 may be an interchangeable objective lens and the tube lens 351 may be included as part of a turret lens assembly (e.g., similar to the interchangeable objective lens 250 and the turret lens assembly 280 of FIG. 2). In various implementations, the objective lens 350, tube lens 351, or any of the other lenses referenced herein may be formed from or operate in conjunction with individual lenses, compound lenses, etc. The tube lens 351 receives the workpiece light 355 and outputs it to the relay lens 352.

The relay lens 352 receives the workpiece light 355 and outputs it to the VFL lens 370. The VFL lens 370 receives the workpiece light 355 and outputs it to the relay lens 386. The relay lens 386 receives the workpiece light 355 and outputs it to the camera system 360. In various implementations, the camera system 360 may capture an image of the workpiece 320 during an image exposure period, and may provide the image to a control system portion (e.g., similar to the operation of the camera system 260 for providing an image to the control system portion 120 in FIG. 2).

The VFL lens 370 is electronically controllable to vary the focus position FP of the imaging system during one or more image exposures. The focus position FP may be moved within a range R bound by a focus position FP1 and a focus position FP2. It will be appreciated that in various implementations, the range R may be selected by a user or may result from design parameters or may otherwise be automatically determined. In general with respect to the example of FIG. 3, it will be appreciated that certain of the illustrated dimensions may not be to scale. For example, the VFL lens 370 may have different proportional dimensions than those illustrated (e.g., may be less wide and up to 50 mm long or longer for certain applications in order to provide a desired amount of lensing power, etc.)

In various implementations, a machine vision inspection system may comprise a control system (e.g., the control system 120 of FIG. 2) that is configurable to control the VFL lens 370 to periodically modulate a focus position of the imaging system 300. In some implementations, the VFL lens 370 may very rapidly adjust or modulate the focus position (e.g., periodically, at a rate of at least 300 Hz, or 3 kHz, or 70 kHz, or much higher). In some implementations, the range R may be as large as 10 mm (for a 1× objective lens 350). In various implementations, the VFL lens 370 is advantageously chosen such that it does not require any macroscopic mechanical adjustments in the imaging system and/or adjustment of the distance between the objective lens 350 and the workpiece 320 in order to change the focus position FP. In such a case, as described in the previously incorporated '980 publication, an extended depth of field image may be provided at a high rate, and furthermore there are no macroscopic adjustment elements nor associated positioning non-repeatability to degrade accuracy when the same imaging system is used for acquiring fixed focus inspection images, which may be used for precision measurements (e.g., for accuracies on the order of a few micrometers, or tenths of micrometers, or less) and the like. As described in the previously incorporated '726 publication, the changes in the focus position FP may also be utilized to rapidly acquire an image stack including a plurality of images at a plurality of positions along a Z-height direction proximate to the workpiece 320.

In various implementations, the VFL lens 370 may be a tunable acoustic gradient index of refraction ("TAG") lens. A tunable acoustic gradient index of refraction lens is a high-speed VFL lens that uses sound waves in a fluid medium to modulate a focus position and may periodically sweep a range of focal lengths at a frequency of several hundred kHz. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated herein by reference in its entirety. Tunable acoustic gradient index lenses and related controllable signal generators are available, for example, from TAG Optics, Inc., of Princeton, N.J. The Model TL2.B.xxx series lenses, for example, are capable of modulation up to approximately 600 KHz.

The VFL lens 370 may be driven by a lens controller 374, which may generate a signal to operate the VFL lens 370. In one embodiment, the lens controller 374 may be a commercial controllable signal generator such as that referred to above. In some implementations, the lens controller 374 may be configured or controlled by a user and/or an operating program through the imaging control interface 131 and/or the lens control interface 134 and/or a user interface of the mode 134m, outlined previously with respect to FIG. 2. In some implementations, the VFL lens 370 may be operated using a periodic signal such that the focus position FP is modulated sinusoidally over time, at a high frequency. For example, in some exemplary implementations, a tunable acoustic gradient index of refraction lens may be configured for focal scanning rates as high as 400 kHz, although it should be appreciated that slower focus position adjustments and/or modulation frequencies may be desirable in various implementations and/or applications. For example, in various implementations a periodic modulation of 300 Hz, or 3 kHz, or 70 kHz, or 250 kHz, or the like may be used. In implementations where slower focus position adjustments are used, the VFL lens 370 may comprise a controllable fluid lens, or the like.

In the implementation of FIG. 3, the relay lenses 352 and 386 and the VFL lens 370 are designated as being included in a 4f optical configuration, while the relay lens 352 and the tube lens 351 are designated as being included in a Keplerian telescope configuration, and the tube lens 351 and the objective lens 350 are designated as being included in a microscope configuration. All of the illustrated configurations will be understood to be exemplary only, and not limiting with respect to the present disclosure. As part of the Keplerian telescope configuration, a focal distance $F_{TUBE}$ of the tube lens 351 is illustrated as being approximately equidistant to a midpoint between the lenses 351 and 352 as is a focal distance f of the relay lens 352. In alternative implementations, the focal distance $F_{TUBE}$ for the tube lens 351 may be made to be different than the focal distance f of the relay lens 352 (which corresponds to one of the 4 f's of the 4f optical configuration). In various implementations where the tube lens 351 may be included as part of a turret lens assembly, it may be desirable for other tube lenses of the turret lens assembly when rotated into the operational position to have a focal point at the same location (i.e., so as to meet the focal point of the relay lens 352).

The ratio of the focal distance $F_{TUBE}$ to the focal distance f can be utilized to alter the diameter of the collimated beam of workpiece light 355 out of the relay lens 352 relative to the collimated beam of the workpiece light 355 that is input to the tube lens 351. This can be used for adjusting the size of the projection of a limiting aperture at the objective lens 350 to the location of the VFL lens 370, in various implementations. The illustrated 1:1 ratio (i.e., where $F_{TUBE}$=f) in FIG. 3 is exemplary only, and not limiting with respect to the present disclosure. For example, as will be described in more detail below with respect to FIG. 6, more generally it is desirable for an actual effective aperture for the VFL lens 370 to be at least as large as an objective lens clear aperture as projected to the location of the VFL lens (i.e., in various embodiments this is a desired effective aperture for the VFL lens). As one alternative example, if $F_{TUBE}$=2*f, due to the projection of the objective lens clear aperture to the VFL lens with a reduction or demagnification of one half, the desired effective aperture for the VFL lens can be reduced relative to a configuration where $F_{TUBE}=f$, while still allowing the VFL lens to provide adequate accommodation of off-axis field points; which might otherwise be vignetted or experience large aberrations in a "thick" VFL lens such as a TAG lens. It will also be appreciated with respect to the collimated beams of workpiece light 355 that are respectively input to the tube lens 351 and output from the relay lens 352, that in various implementations such collimated beams may be extended into longer path lengths and/or beam splitters may be utilized with respect to such collimated beams for providing additional optical paths (e.g., as directed to different camera systems, etc.).

In various implementations, the illustrated 4f optical configuration permits placing the VFL lens 370 (e.g., which may be a low numerical aperture (NA) device, such as a tunable acoustic gradient index of refraction lens), at the fourier plane FPL of the objective lens 350. This configuration may maintain the telecentricity at the workpiece 320 and may minimize scale change and image distortion (e.g., including providing constant magnification for each Z height of the workpiece 320 and/or focus position FP). The Keplerian telescope configuration (e.g., including the tube lens 351 and the relay lens 352) may be included between the microscope configuration and the 4f optical configuration, and may be configured to provide a desired size of the projection of the objective lens clear aperture at the location of the VFL lens, so as to minimize image aberrations, etc., as outlined above.

It will be appreciated that in various implementations, certain types of dimensional measurements may require near-diffraction or diffraction-limited imaging. The configuration illustrated in FIG. 3 reduces aberrations by restricting the off-axis position of the pupil of the objective lens 350 that is imaged into the VFL lens 370 to the fourier plane FPL. In this configuration, the radial position may be maintained to be less than the radial position of the 1st Bessel ring in the refractive index profile of the standing wave of the VFL lens 370 (e.g., a tunable acoustic gradient index of refraction lens) at its lowest resonant frequency $f_{R,MIN}$. In this manner, light from the microscope configuration (i.e., including the objective lens 350 and the tube lens 351) does not exceed the largest clear aperture $CA_{VFL,MAX}$ of the VFL lens 370. In a configuration where the light did exceed the largest clear aperture, in various implementations the light could interact with the region of the standing wave of the VFL lens 370 that may have a relative, negative refractive index which could increase aberrations and be less suitable for precise dimensional measurements.

Figure 4:
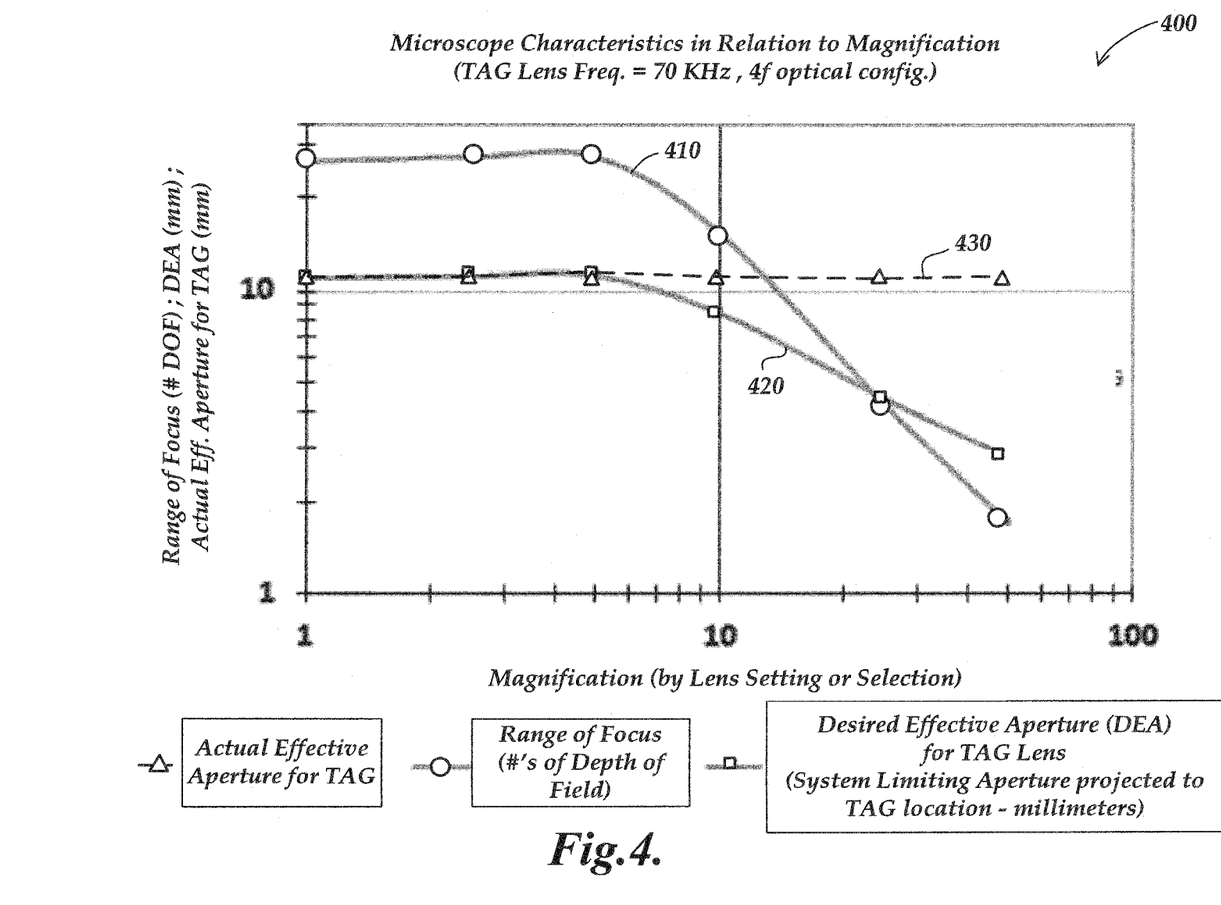
FIG. 4 is a diagram of a graph illustrating microscope characteristics in relation to magnification when one type of variable focal length lens is operated at a constant resonant frequency.

FIG. 4 is a diagram of a graph 400 illustrating microscope characteristics in relation to magnification when a VFL lens (e.g., such as the VFL lens 370 of FIG. 3) is operated at a constant resonant frequency (e.g., 70 kHz). As will be described in more detail below, one issue that may occur with a 4f optical microscope configuration (e.g., such as that illustrated in FIG. 3) is that in various implementations a normalized scan range $\Delta Z_{VFL}$ of the 4f optical microscope configuration may not be constant. That is, $\Delta Z_{VFL}$ (in DOF) near the object may scale inversely with the square of the microscope magnification (i.e., $1/NA_{OBJ}^2$) as indicated by the following equation:

$$\Delta Z_{VFL}=(NA_{TUBE}^2/NA_{OBJ}^2)(nf_R^2/f_{VFL,eff}) \quad \text{Eq. 1}$$

where $nf_R^2$ is in relation to the relay lens 352 and $f_{VFL,eff}$ is in relation to the operating amplitude $A_{VFL}$ for the VFL lens 370.

In various implementations, the microscope configuration may include a variable magnification lens portion (e.g., wherein the objective lens 350 is interchangeable, or including a zoom lens, a turret lens, etc.) As a specific example, in one implementation a variable magnification lens portion may include a set of interchangeable fixed magnification objective lenses corresponding to different magnifications (e.g., 0.5×, 1×, 2× or 2.5×, 5×, 10×, 20× or 25×, 50×, 100×, etc.), wherein the current objective lens 350 may represent one of the lenses that has been selected from the set. In various implementations, the objective lenses that are utilized may be plan apochromat (APO) objective lenses. One issue with such configurations that may occur, as indicated by EQUATION 1, is that in various implementations higher magnifications $M_i$(i.e., higher $NA_{OBJ}^2$) may correspond to significantly smaller normalized scan ranges $\Delta Z_{VFL}$.

As illustrated in FIG. 4, a first line 410 represents ranges of focus (e.g., corresponding to normalized scan ranges $\Delta Z_{VFL}$) as plotted versus magnification (e.g., as determined by a variable magnification lens portion, which may include a lens setting or selection in various implementations). For the line 410, the magnification (e.g., 1×, 10×, etc.) is indicated on the x-axis, and the ranges of focus are measured in terms of numbers of depths of field (DOF) which are indicated on the y-axis. In various implementations, the range of focus may correspond to the total overall range of focus including all of the lenses and components of the imaging system (e.g., the imaging system 300 of FIG. 3). As illustrated by the line 410, for the constant resonant frequency (e.g., 70 kHz) at which the VFL lens 370 is operated, certain increases in magnification correspond to decreases in the range of focus. More specifically, for the magnifications from 1× to 5×, the range of focus is shown to be approximately +28 DOF, while for the magnification of 10× the range of focus is shown to have decreased to approximately ±15 DOF, and for the magnification of 25× the range of focus is shown to have decreased to approximately ±4 DOF, and for the magnification of 50× the range of focus is shown to have decreased to approximately ±1.8 DOF. These significant drops in the range of focus for the higher magnifications result in such configurations being less suitable for certain precision measurement applications.

In various implementations, different approaches may be utilized for attempting to increase the range of focus for higher magnifications. For example, one method for varying the axial Z-scan range for a tunable microscope may be to change the current for operating the VFL lens 370. Another method would be to change the sinusoidal piezo amplitude $A_{VFL}$ for operating the VFL lens 370. However, EQUATION 1 indicates that these approaches by themselves may be insufficient for certain applications (e.g., for the above-described example implementation a factor of 25× optical power may be required to utilize the entire set of magnifications ranging from 1× to 50× for the variable magnification lens portion).

With respect to the utilization of the objective lenses in a configuration such as that illustrated in FIG. 3, the clear aperture CA also decreases (e.g., as a higher magnification objective lens is selected), as indicated by the following equation:

$$CA_{OBJ}=2*EFL_{OBJ}*NA_{OBJ} \quad \text{Eq. 2}$$

This is further illustrated in FIG. 4, with respect to a second line 420 which represents desired effective aperture (DEA) for a VFL lens 370 as plotted versus magnification. For the line 420, the magnification (e.g., 1×, 10×, etc.) is indicated on the x-axis, and the DEA is measured in terms of millimeters, which are indicated on the y-axis. It will be appreciated that the lines 410 and 420 are thus plotted with respect to different types of units on the y-axis (e.g., number of depths of field, or millimeters), and are only provided on the same graph for purposes of illustrating the various effects that occur as the magnification is increased. With respect to the line 420, the illustrated DEA's for the VFL lens 370 may correspond in the configuration of FIG. 3 to a system limiting aperture as projected to the location of the VFL lens 370, as related to the clear aperture CA of the selected objective lens 350 as described above with respect to EQUATION 2. More specifically, this may correspond to an afocal beam footprint (e.g., for the on-axis and maximum off-axis field points) of the pupil of the objective lens 350 as seen at the input to the relay lens 352 adjacent to the VFL lens 370. The footprint follows the objective lens clear aperture $CA_{OBJ}$ multiplied by a scaling factor and, if maintained, avoids vignetting inside the VFL lens 370. This is desirable so that the capabilities of relatively expensive high magnification and high NA lenses (e.g., objective lenses) are not wasted by occluding the "high NA" rays of the resulting image light in the VFL lens. In various implementations, a limiting aperture may intentionally be defined by a specific configuration or component (e.g., a plate included on or next to one of the lenses in the optical path) so as to ensure that only a limited portion of the corresponding lenses will be utilized (e.g., to avoid utilization of the outer portions of the lenses which may produce various levels of distortion, etc.)

As further illustrated in FIG. 4, a third line 430 represents the actual effective aperture for the VFL lens 370 as plotted versus magnification. In various implementations, for certain types of VFL lenses 370 (e.g., tunable acoustic gradient index of refraction lenses which in some cases may be relatively long and narrow and may utilize sound waves in a fluid medium), the effective aperture may represent the diameter of the optical path through the VFL lens 370. For the line 430, the magnification (e.g., 1×, 10×, etc.) is indicated on the x-axis, and the actual effective aperture is measured in terms of millimeters which is indicated on the y-axis. The line 430 illustrates that the actual effective aperture remains relatively constant (e.g., at approximately 11 mm), as corresponding to the constant amplitude and frequency (i.e., 70 kHz) utilized for operating the VFL lens 370. The differences between the lines 420 and 430 indicate that, because higher magnification lenses (e.g., objective lenses) may have smaller diameter clear apertures, less of the VFL lens 370 aperture diameter that is available at the constant operating amplitude and frequency (i.e., 70 kHz) is required as the microscope magnification increases. The principles disclosed herein take advantage of this to make adjustment to the VFL lens that may improve the consistency of the range of focus. More specifically, as will be described in more detail below with respect to FIG. 6, in accordance with the principles of the present disclosure, at higher magnifications, higher operating frequencies may be utilized for the VFL lens 370 so as to maintain a more consistent range of focus.

Figure 5:
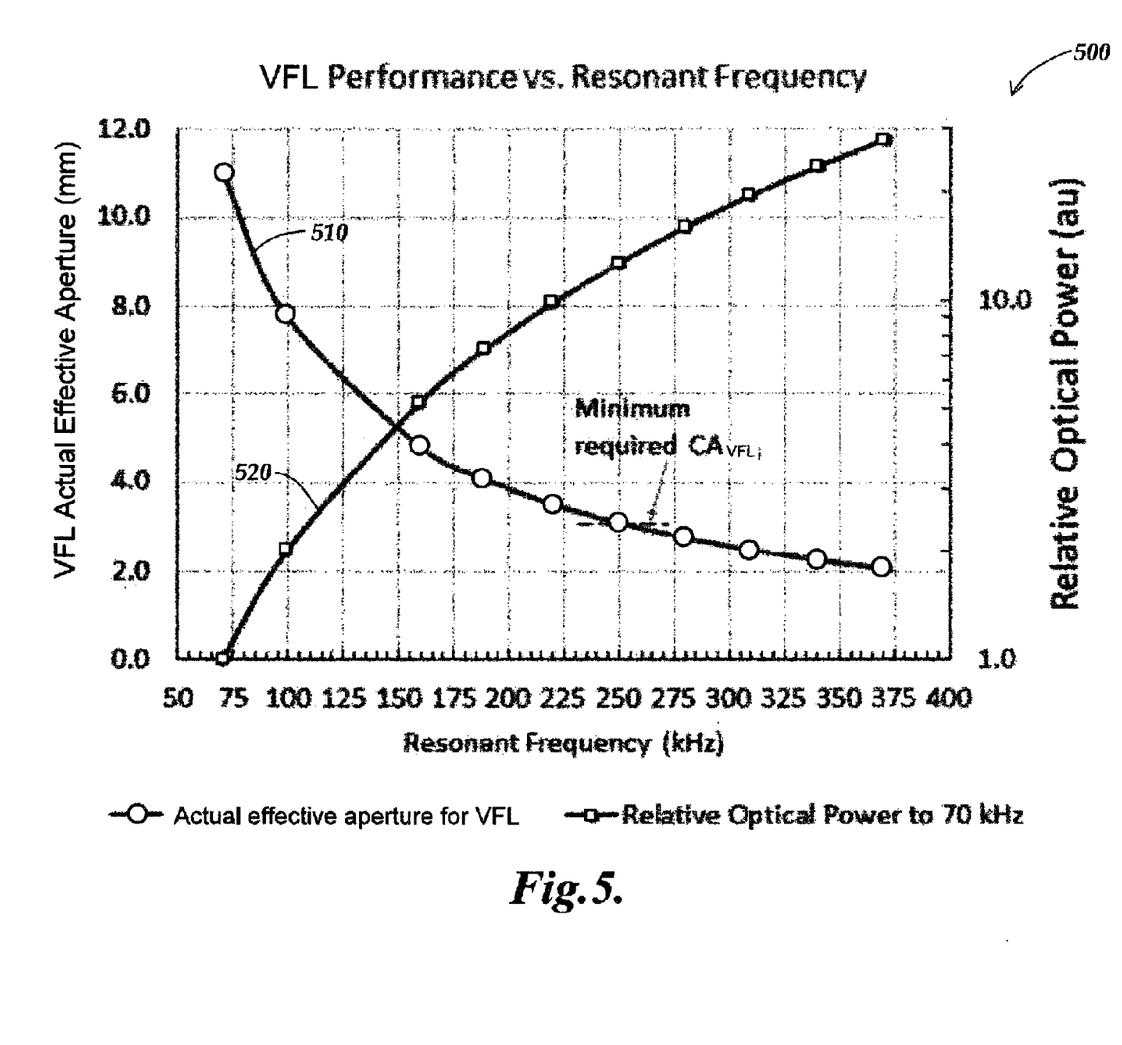
FIG. 5 is a diagram of a graph illustrating lens performance versus resonant frequency for one type of variable focal length lens.

FIG. 5 is a diagram of a graph 500 illustrating VFL lens performance versus resonant frequency. A line 510 represents the actual effective aperture for the VFL lens 370 as plotted versus the resonant frequency for operating the VFL lens 370. For the line 510, the frequency is indicated in terms of kHz on the x-axis, and the actual effective aperture is measured in terms of millimeters which is indicated on the y-axis (in accordance with the scale on the left side of the graph 500). In one implementation, the actual effective aperture may be designated as corresponding to the 1st Bessel ring position or clear aperture of the VFL lens 370. The line 510 illustrates how the actual effective aperture decreases as the resonant frequency increases. More specifically, the actual effective aperture is shown to drop over a range starting at approximately 11 mm for the operating frequency of 70 kHz (i.e., the frequency utilized in the graph of FIG. 4), to approximately 2 mm at the operating frequency of approximately 370 kHz. In various implementations, a minimum actual effective aperture $CA_{VFL}$ of the VFL lens 370 may be established which corresponds to a maximum operating frequency $f_{R,MAX}$, above which the image quality may be determined to be negatively affected. For example, in accordance with the example of FIG. 5, for a minimum actual effective aperture $CA_{VFL}$ of approximately 3 mm, the maximum operating frequency $f_{R,MAX}$ is 250 kHz.

As further illustrated in FIG. 5, a second line 520 represents a relative optical power for a VFL lens 370 as plotted versus the resonant frequency for operating the VFL lens 370. For the line 520, the frequency is indicated in terms of kHz on the x-axis, and the relative optical power is measured in terms of multiples of the optical power at 70 kHz which is indicated on the y-axis (in accordance with the scale on the right side of the graph 500). It will be appreciated that the lines 510 and 520 are thus plotted with respect to different types of units on the y-axis (e.g., millimeters vs multiples of optical power), and are only provided on the same graph for purposes of illustrating the various effects that occur as the frequency is increased. With respect to the line 520, the relative optical power is shown to increase as the frequency increases. More specifically, the relative optical power is shown to increase over a range starting at a value of 1 at the operating frequency of 70 kHz, to a value of approximately 25 at the operating frequency of approximately 370 kHz. As will be described in more detail below with respect to FIG. 6, in accordance with the principles of the present disclosure, the higher levels of optical power that are available at the higher resonant operating frequencies may be utilized to maintain a more consistent range of focus as the magnification of the variable magnification lens portion is increased.

Figure 6:
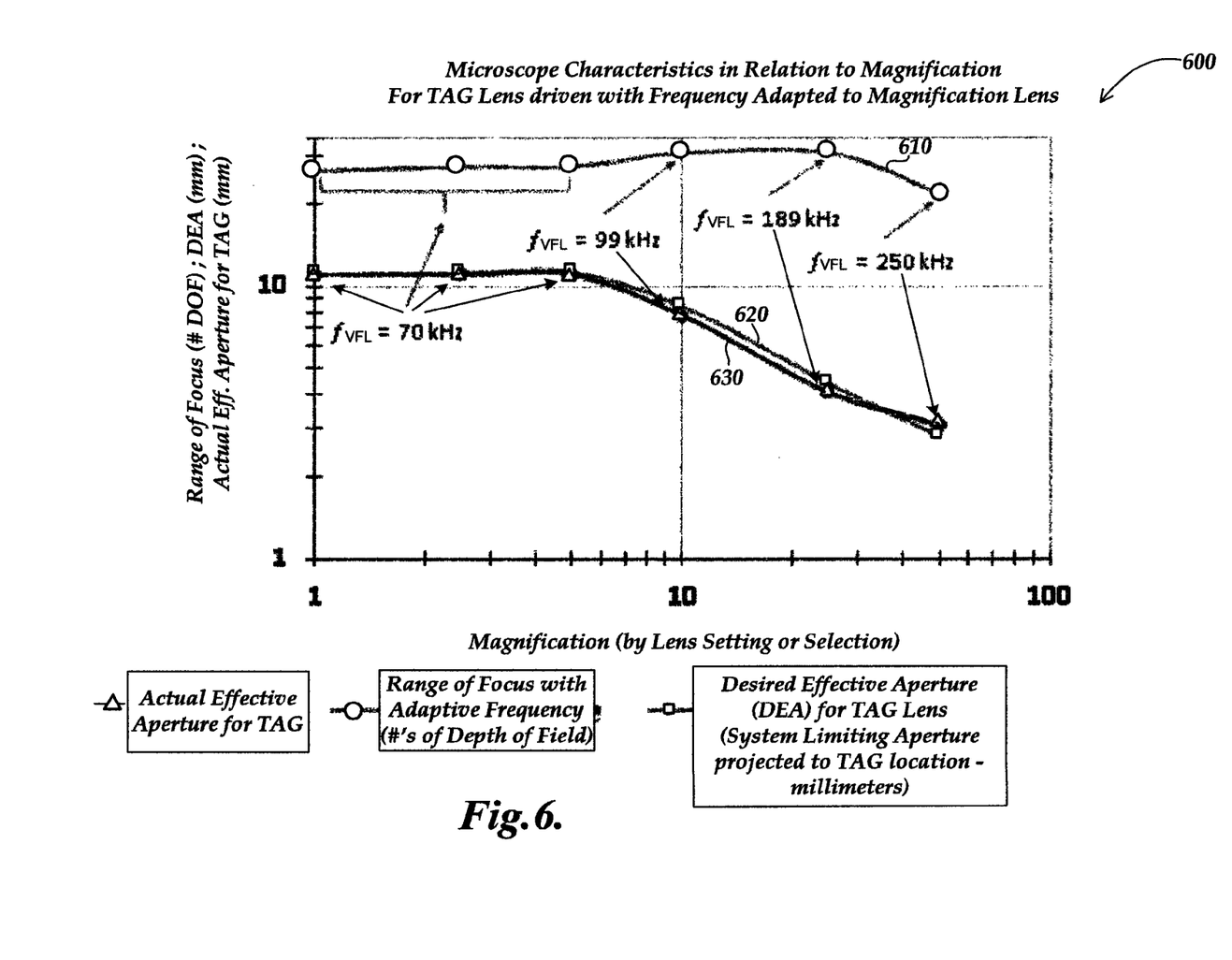
FIG. 6 is a diagram of a graph illustrating microscope characteristics in relation to magnification when one type of variable focal length lens is operated at different resonant frequencies corresponding to different magnifications.

FIG. 6 is a diagram of a graph 600 illustrating microscope characteristics in relation to magnification when a VFL lens is operated at different resonant frequencies corresponding to different magnifications. The graph 600 includes lines 610, 620 and 630, which are comparable to the lines 410, 420 and 430 of FIG. 4, and which are plotted with respect to the same units. More specifically, the line 610 represents ranges of focus (e.g., corresponding to normalized scan ranges $\Delta Z_{VFL}$) as plotted versus magnification, the line 620 represents desired effective aperture (DEA) for the VFL lens as plotted versus magnification, and the line 630 represents the actual effective aperture for the VFL lens 370 as plotted versus magnification. As indicated in FIG. 6, for the magnifications of 1×, 2.5× and 5×, the operating frequency is maintained at the same 70 kHz that was utilized in the implementation of FIG. 4 (for which the range of focus was relatively constant over this range of magnifications at approximately ±28 DOF).

For the magnification of 10×, in accordance with the principles of the present disclosure, the operating frequency for the VFL lens has been increased to 99 kHz. In accordance with the values indicated in FIG. 5, the operating frequency of 99 kHz corresponds to an actual effective aperture for the VFL lens of approximately 8 mm and a relative optical power of approximately 2.5 times the optical power at 70 kHz. As shown in FIG. 6, the line 630 thus indicates that the actual effective aperture for the VFL lens has been reduced to the value of approximately 8 mm, which is similar to the corresponding value indicated by the line 620 for the desired effective aperture (DEA) at the magnification of 10×. More specifically, for the magnification of 10×, the operating frequency for the VFL lens has been increased to a level (i.e., 99 kHz) where the actual effective aperture for the VFL lens more closely matches the desired effective aperture (DEA), which as described above with respect to FIG. 4 represents a system limiting aperture as projected to the location of the VFL lens. As a further result of the increase of the operating frequency to 99 kHz and the corresponding increase in relative optical power, the line 610 indicates that the range of focus has been maintained at nearly the same level (e.g., slightly above the approximately ±28 DOF) for the magnification of 10×.

For the magnification of 25×, the operating frequency for the VFL lens has been increased to 189 kHz. In accordance with the values indicated in FIG. 5, the operating frequency of 189 kHz corresponds to an actual effective aperture for the VFL lens of approximately 4 mm and a relative optical power of approximately 7 times the optical power at 70 kHz. As shown in FIG. 6, the line 630 thus indicates that the actual effective aperture for the VFL lens has been reduced to the value of approximately 4 mm, which is similar to the corresponding value indicated by the line 620 for the desired effective aperture (DEA) at the magnification of 25×. As a further result of the increase of the operating frequency to 189 kHz and the corresponding increase in relative optical power, the line 610 indicates that the range of focus has been maintained at nearly the same level (e.g., slightly above the approximately ±28 DOF) for the magnification of 25×.

For the magnification of 50×, the operating frequency for the VFL lens has been increased to 250 kHz. In accordance with the values indicated in FIG. 5, the operating frequency of 250 kHz corresponds to an actual effective aperture for the VFL lens of approximately 3 mm and a relative optical power of approximately 12 times the optical power at 70 kHz. As shown in FIG. 6, the line 630 thus indicates that the actual effective aperture for the VFL lens has been reduced to the value of approximately 3 mm, which is similar to the corresponding value indicated by the line 620 for the desired effective aperture (DEA) at the magnification of 50×. As a further result of the increase of the operating frequency to 250 kHz and the corresponding increase in relative optical power, the line 610 indicates that the range of focus has been maintained at nearly the same level (e.g., slightly below the approximately ±28 DOF) for the magnification of 50× as was indicated for the lower range of magnifications.

In accordance with the principles of the present disclosure, it can be seen that by adapting the operating frequency for the VFL lens to higher frequencies for the higher magnifications of the microscope configuration, the range of focus may be maintained at a more consistent level. More specifically, as indicated in FIG. 6, by operating the VFL lens at the frequencies of 99 kHz, 189 kHz and 250 kHz for the magnifications of 10×, 25× and 50×, respectively, the range of focus is maintained at a similar level (i.e., approximately ±28 DOF) as was available for the lower magnifications in the range between 1× and 5×. Such configurations allow for operation across a range of magnifications, while still achieving a useful range of focus at the different magnifications. For example, a variable magnification lens portion may be included as part of the imaging system of FIG. 3, for which a set of interchangeable fixed magnification objective lenses corresponding to different magnifications (e.g., 0.5×, 1×, 2× or 2.5×, 5×, 10×, 20× or 25×, 50×, 100×, etc.) may be utilized and for which the VFL lens may be operated at a frequency that is determined according to which objective lens from the set has been selected. In various implementations, such sets of objective lenses may be designated as including a lowest magnification lens (e.g., 0.5× or 1×), a highest magnification lens (e.g., 50× or 100×) and a plurality of intermediate magnification lenses (e.g., 2.5×, 5×, 10×, 25×).

In accordance with the above-described example values in FIG. 6, it can be seen that the optical path is configured such that when the imaging system is operated using a designated first magnification state, a central diameter of the VFL lens that is used for imaging may be a first imaging diameter (e.g., corresponding to the actual effective aperture) that is at least 4.0 mm (e.g., corresponding to a magnification state of 25× or lower), or may be a first imaging diameter that is at least 8.0 mm (e.g., corresponding to a magnification state of 10× or lower). In addition, when a second magnification state is designated (e.g., corresponding to a higher magnification than the first magnification state), the central diameter of the VFL lens that is used for imaging may be a second imaging diameter that is less than the first imaging diameter (e.g., as the magnifications increase, the actual effective aperture for the VFL lens is decreased in accordance with the higher operating frequencies).

Furthermore, the optical path is configured such that the central diameter of the VFL lens that is used for imaging is not the limiting aperture of the imaging system for the first or second magnification states. For example, in accordance with the indicated values of FIG. 6 (e.g., as corresponding to the illustrated configuration of FIG. 3), the actual effective aperture for the VFL lens is approximately the same as the desired effective aperture, and is thus not the limiting aperture of the imaging system. As described above with respect to FIG. 3, in other implementations the ratio of the focal distance $F_{TUBE}$ to the focal distance f may be made to be other than 1:1 (e.g., 2:1), for which the actual effective aperture for the VFL lens 370 need not be at least as large as an objective lens clear aperture (i.e., corresponding to a desired effective aperture for the VFL lens). In such implementations, the system may be configured according to the corresponding ratio of the focal distance $F_{TUBE}$ to the focal distance f so that the actual effective aperture for the VFL lens will not be the limiting aperture of the imaging system.

In various implementations, a limiting aperture may intentionally be defined by a specific configuration or component (e.g., a plate with a specifically sized aperture included on or next to one of the lenses in the optical path) so as to ensure that only a desired portion of the corresponding lenses will be utilized (e.g., to avoid utilization of the outer portions of the lenses which may produce various levels of distortion, etc.). In general, it may be undesirable for the actual effective aperture of the VFL lens 370 to be the limiting aperture, in that, depending on the configuration, the actual effective aperture of the VFL lens 370 may otherwise result in significant reductions in the imaging capabilities of the system (e.g., as illustrated by the reduction in the range of focus in FIG. 4). Such reductions may correspond to less utilization of the usable range of the lenses in the variable magnification lens portion (e.g., such as higher magnification objective lenses which may be relatively expensive and for which utilization of as much of the usable range as possible may be desirable).

When configuring the imaging system according to the values indicated in FIG. 6, in various implementations the light source (e.g., light source 330 of FIG. 3) may be designed with a pulsed mode that is made to accommodate the 250 kHz operating frequency of the VFL lens, and thus may be 3.6 times faster than a similar pulsed mode for a 70 kHz operating frequency (i.e., 250 kHz/70 kHz=3.6). In one specific example implementation, for obtaining images corresponding to ⅕th depth of field (DOF) sampling for points from focus (PFF) operations, LEDs that are utilized for the light source 330 may be pulsed at 35 nsec (30 MHz) for accommodating a 250 kHz operating frequency (e.g., as compared to being pulsed at 125 nsec for accommodating a 70 kHz operating frequency). Similarly, an LED driver utilized for the PFF sampling may be configured to operate 3.6× faster for accommodating the 250 kHz operating frequency, as compared to one for accommodating the 70 kHz operating frequency (e.g., for which $t_{RISE}$~250 nsec in one specific example implementation). In various implementations, such speeds for the light source for accommodating the 250 kHz operating frequency may also be achieved utilizing technologies other than LEDs (e.g., laser sources such as super-continuum, Ti:sapphire, InGaN laser diode, etc.) which may more typically be configured for operating at such higher speeds.

In various implementations, in addition to operating the VFL lens at different frequencies depending on the magnification level of the microscope portion, it may also be desirable to configure the telescope configuration according to certain additional design principles. For example, in a configuration where a set of interchangeable objective lenses are utilized as part of the variable magnification lens portion, it may be desirable to configure the telescope optics to accommodate the objective lens with the largest pupil diameter (i.e., corresponding to the lowest magnification level $M_1$) and the largest off-axis field point for a specific size detector format (e.g., ½", ⅓", etc.). In the above examples where a set of objective lenses includes a range of magnification levels NA; from 1× to 50×, this would indicate configuring the telescope optics according to accommodating the lowest magnification (e.g., corresponding to the 1× lens). In configuring the telescope optics in this manner, all of the other objective lenses in the set will also automatically be accommodated, a high image quality will be maintained across the full set of objective lenses, and an acceptable absolute baseline range of focus will result. As described above with respect to EQUATION 2, such a configuration may have insufficient optical power $P_{VFL,i}$ by itself to yield a constant range of focus (e.g., corresponding to a constant scan range $\Delta Z_{VFL}$), although by operating the VFL lens at different frequencies in accordance with the principles of the present disclosure, a more consistent range of focus is produced in such a system and image aberrations are also minimized.

Figure 7:
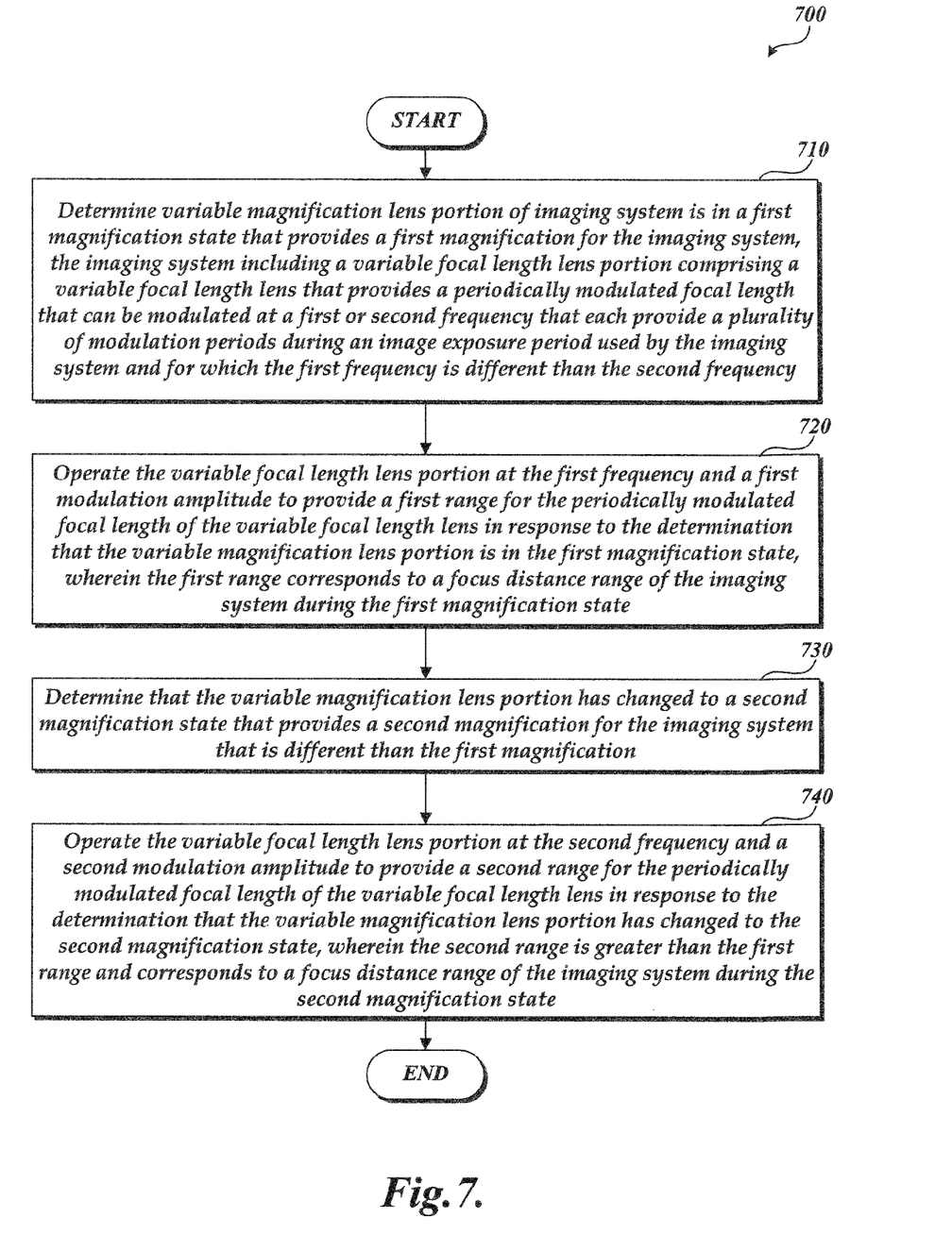
FIG. 7 is a flow diagram illustrating one exemplary implementation of a routine for operating an imaging system including a variable focal length lens.

FIG. 7 is a flow diagram illustrating one exemplary implementation of a routine 700 for operating an imaging system including a VFL lens. At a block 710, a determination is made that a variable magnification lens portion of the imaging system is in a first magnification state that provides a first magnification for the imaging system. As described above with respect to FIGS. 1-3, the imaging system may include a variable focal length lens portion comprising a VFL lens (e.g., the VFL lens 370) that provides a periodically modulated focal length that can be modulated at a first or second frequency that each provide a plurality of modulation periods during an image exposure period used by the imaging system and for which the first frequency is different than the second frequency. At a block 720, the variable focal length lens portion is operated at the first frequency and a first modulation amplitude to provide a first range for the periodically modulated focal length of the VFL lens in response to the determination that the variable magnification lens portion is in the first magnification state. The first range may correspond to a focus distance range of the imaging system during the first magnification state.

At a block 730, a determination is made that the variable magnification lens portion has changed to a second magnification state that provides a second magnification for the imaging system that is different than the first magnification. At a block 740, the variable focal length lens portion is operated at the second frequency and a second modulation amplitude to provide a second range for the periodically modulated focal length of the VFL lens in response to the determination that the variable magnification lens portion has changed to the second magnification state. The second range may be greater than the first range and may correspond to a focus distance range of the imaging system during the second magnification state.

In various implementations, a determination as to whether a first or second magnification state has been selected (e.g., as corresponding to a selection from a set of objective lenses ranging from 1× to 50×) to be used in the variable magnification lens portion may be made in accordance with different types of determination methods. For example, an input may be received corresponding to a user selection of one of the fixed magnification lenses, such as a user physically selecting an objective lens or utilizing the input/output interface 130 of FIG. 2 to select an objective lens. As another example, an indicator as associated with one of the fixed magnification lenses may be electronically sensed (e.g., utilizing optics, scanning, RFID, etc.) when the fixed magnification lens is moved into position to be used in the variable magnification lens portion. As another example, a magnification of the imaging system may be evaluated after the fixed magnification lens has been moved into position to be used in the variable magnification lens portion.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. An imaging system, comprising:
   a high speed variable focal length lens;
   an optical path, comprising:
      a variable magnification lens portion that can be altered between a first magnification state that provides a relatively lower magnification for the imaging system and a second magnification state that provides a relatively higher magnification for the imaging system; and
      a variable focal length lens portion comprising a variable focal length lens that provides a periodically modulated focal length that can be modulated at a first or second frequency that each provide a plurality of modulation periods during an image exposure period used by the imaging system;

wherein, the variable focal length lens portion is configured to be operated at the first frequency and a first modulation amplitude to provide a first range for the periodically modulated focal length of the variable focal length lens while the imaging system is operated using the first magnification state, and the first range corresponds to a focus distance range of the imaging system during the first magnification state, and the variable focal length lens portion is configured to be operated at the second frequency and a second modulation amplitude to provide a second range for the periodically modulated focal length of the variable focal length lens while the imaging system is operated using the second magnification state, and the second range is greater than the first range, and the second range corresponds to a focus distance range of the imaging system during the second magnification state.

2. The system of claim 1, wherein the optical path is configured such that when the imaging system is operated using the first magnification state a central diameter of the variable focal length lens that is used for imaging is a first imaging diameter that is at least 4.0 millimeters.

3. The system of claim 2, wherein the first imaging diameter is at least 8.0 millimeters.

4. The system of claim 2, wherein the optical path is configured such that when the imaging system is operated using the second magnification state a central diameter of the variable focal length lens that is used for imaging is a second imaging diameter that is less than the first imaging diameter.

5. The system of claim 4, wherein the optical path is configured such that the central diameter of the variable focal length lens that is used for imaging is not a limiting aperture of the imaging system for the first or second magnification states.

6. The system of claim 1, wherein the variable focal length lens is a tunable acoustic gradient index of refraction lens.

7. The system of claim 1, wherein the variable magnification lens portion includes a first fixed magnification lens that is used to provide the first magnification state, and a second fixed magnification lens that is used to provide the second magnification state.

8. The system of claim 7, wherein the first and second fixed magnification lenses are at least one of:

each selected from a set of fixed magnification lenses of the variable magnification lens portion, the set of fixed magnification lenses including a lowest magnification lens that corresponds to a lowest magnification of the set, a highest magnification lens that corresponds to a highest magnification of the set, and a plurality of intermediate magnification lenses that each correspond to a respective intermediate magnification that are each between the lowest and highest magnifications;

each corresponding to respective magnifications of at least one of 0.5×, 1×, 2×, 2.5×, 5×, 10×, 20×, 25×, 50×, or 100×; or each corresponding to respective magnifications that differ from one another such that the corresponding magnification for one is at least 10 times the corresponding magnification for the other.

9. A non-transitory computer-readable storage medium storing instructions for operating an imaging system, the instructions when executed by a processor causing the processor to at least:

determine that a variable magnification lens portion of the imaging system is in a first magnification state that provides a first magnification for the imaging system, the imaging system including a variable focal length lens portion comprising a variable focal length lens that provides a periodically modulated focal length that can be modulated at a first or second frequency that each provide a plurality of modulation periods during an image exposure period used by the imaging system and for which the first frequency is different than the second frequency;

operate the variable focal length lens portion at the first frequency and a first modulation amplitude to provide a first range for the periodically modulated focal length of the variable focal length lens in response to the determination that the variable magnification lens portion is in the first magnification state, wherein the first range corresponds to a focus distance range of the imaging system during the first magnification state;

determine that the variable magnification lens portion has changed to a second magnification state that provides a second magnification for the imaging system that is different than the first magnification; and operate the variable focal length lens portion at the second frequency and a second modulation amplitude to provide a second range for the periodically modulated focal length of the variable focal length lens in response to the determination that the variable magnification lens portion has changed to the second magnification state, wherein the second range is greater than the first range and corresponds to a focus distance range of the imaging system during the second magnification state.

10. The non-transitory computer-readable storage medium of claim 9, wherein the determining that the variable magnification lens portion is in the first magnification state comprises a determination that a first fixed magnification lens has been selected to be used in the variable magnification lens portion to provide the first magnification state, and the determining that the variable magnification lens portion has been changed to the second magnification state comprises a determination that a second fixed magnification lens has been selected to be used in the variable magnification lens portion to provide the second magnification state.

11. The non-transitory computer-readable storage medium of claim 10, wherein a determination as to whether the first or second fixed magnification lens has been selected to be used in the variable magnification lens portion is made in accordance with at least one of:

receiving an input corresponding to a user selection of one of the fixed magnification lenses;

sensing an indicator as associated with one of the fixed magnification lenses when the fixed magnification lens is moved into position to be used in the variable magnification lens portion; and evaluating a magnification of the imaging system after the fixed magnification lens has been moved into position to be used in the variable magnification lens portion.

12. A method for operating an imaging system used in a precision non-contact metrology system, the method comprising:

providing an optical path for the imaging system, wherein the optical path comprises:

a variable magnification lens portion that can be altered between a first magnification state that provides a relatively lower magnification for the imaging system and a second magnification state that provides a relatively higher magnification for the imaging system; and a variable focal length lens portion comprising a variable focal length lens that provides a periodically modulated focal length that can be modulated at a first or second frequency that each provide a plurality of modulation periods during an image exposure period used by the imaging system, wherein the first frequency is different than the second frequency;

operating the variable focal length lens portion at the first frequency and a first modulation amplitude to provide a first range for the periodically modulated focal length of the variable focal length lens while the imaging system is operated using the first magnification state, wherein the first range corresponds to a focus distance range of the imaging system during the first magnification state, and operating the variable focal length lens portion at the second frequency and a second modulation amplitude to provide a second range for the periodically modulated focal length of the variable focal length lens while the imaging system is operated using the second magnification state, wherein the second range is greater than the first range, and corresponds to a focus distance range of the imaging system during the second magnification state.

13. The method of claim 12, wherein the optical path is configured such that when the imaging system is operated using the first magnification state a central diameter of the variable focal length lens that is used for imaging is a first imaging diameter that is at least 4.0 millimeters.

14. The method of claim 13, wherein the first imaging diameter is at least 8.0 millimeters.

15. The method of claim 13, wherein the optical path is configured such that when the imaging system is operated using the second magnification state the central diameter of the variable focal length lens that is used for imaging is a second imaging diameter that is less than the first imaging diameter.

16. The method of claim 15, wherein the optical path is configured such that the central diameter of the variable focal length lens that is used for imaging is not a limiting aperture of the imaging system for the first or second magnification states.

17. The method of claim 12, wherein the variable focal length lens is a tunable acoustic gradient index of refraction lens.

18. The method of claim 12, wherein the second frequency is at least 2× the first frequency.

19. The method of claim 12, wherein the first and second frequencies are each at least 10 kHz.

20. The method of claim 12, wherein the precision non-contact metrology system is a machine vision inspection system, and the method further comprises operating the imaging system using at least one of the first magnification state or the second magnification state to acquire a plurality of images at a plurality of positions along a Z-height direction proximate to a workpiece.

* * * * *